Sheet 1,
3 Sheets.

A. Hoermann.

Die for Cutting Screws.

N° 82,118.

Patented Sept. 15, 1868.

Witnesses
C. C. Livings
W. C. Dey

Inventor
A. Hoermann

A. Hoermann.
Die for Cutting Screws.

N.º 82,118. Patented Sept. 15, 1868.

Witnesses,
C. C. Livings
Wm. E. Dey

Inventor
A. Hoermann

Sheet 3,
3 Sheets.
A. Hoermann.
Die for Cutting Screws.
Nº 82,118.   Patented Sept. 15, 1868.
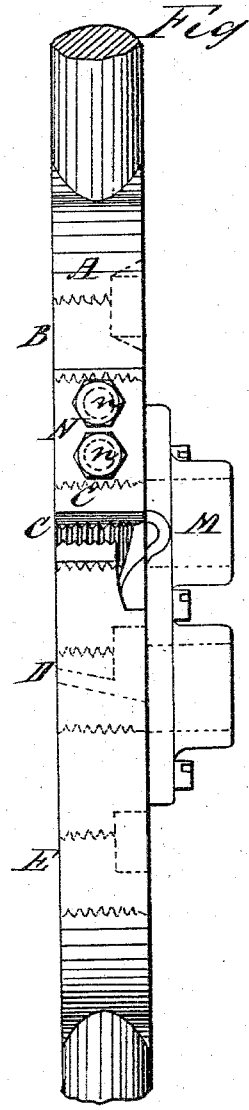
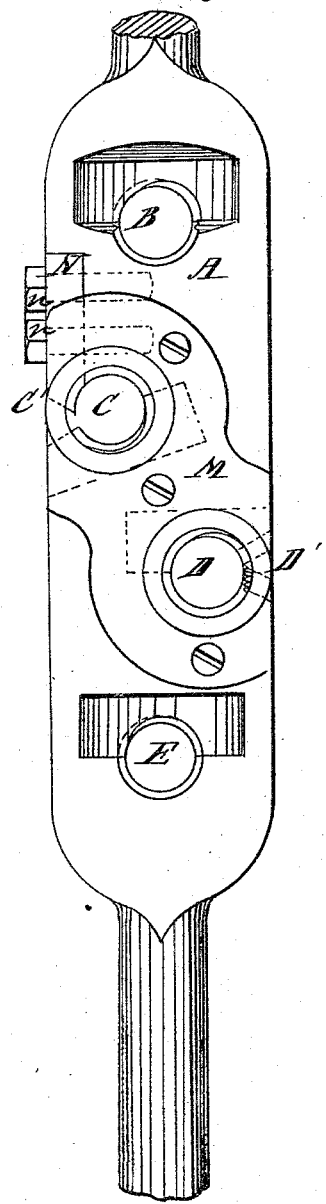
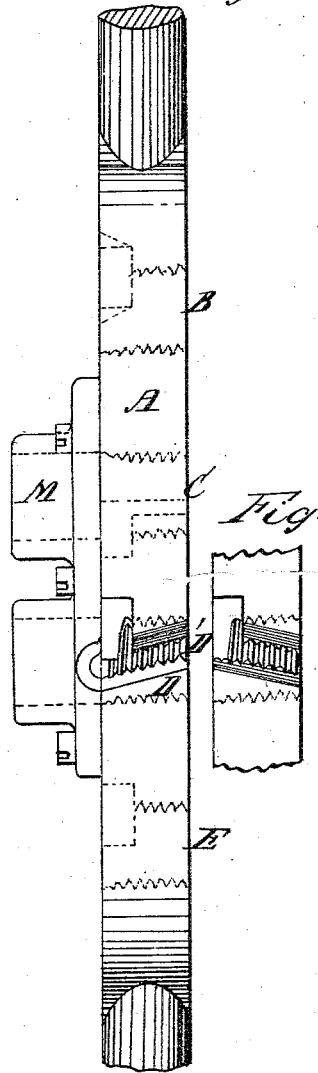
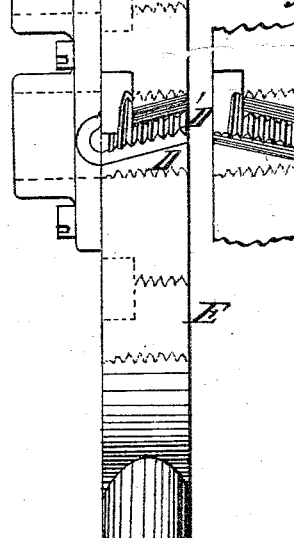
Witnesses.
C. C. Livings
W. C. Dey
Inventor
A. Hoermann

United States Patent Office.

ARNOLD HOERMANN, OF NEW YORK, N. Y.

Letters Patent No. 82,118, dated September 15, 1868; antedated September 4, 1868.

IMPROVEMENT IN SCREW-CUTTING DIES.

*The Schedule referred to in these Letters Patent and making part of the same.*

TO ALL WHOM IT MAY CONCERN:

Be it known that I, ARNOLD HOERMANN, of the city and county of New York, and State of New York, have invented certain new and useful Improvements in Dies for Cutting Screws; and I do hereby declare that the following is a full and exact description thereof.

I will first describe what I consider the best means of carrying out my invention, and will afterwards designate the points which I believe to be new.

The accompanying drawings form a part of this specification.

Figure 1 is an edge view, and

Figure 2 a face view of one form of my improvement.

Figure 3 is an edge view.

Figure 4, a face view of another form, and

Figures 8 to 17, inclusive, indicate the means which I propose to employ in manufacturing my improved dies. They represent the dies in the act of being milled on the face which receives the material to be cut. The several figures represent mills in different positions and in different forms for finishing the face of the die properly, according to this invention.

Figure 18 is an edge view of another form of my invention.

Figure 19 is a face view of the same, and

Figure 20 is an edge view of the opposite edge of the same.

Figure 20$^a$ is a sketch of another form of the inclined position of the cavity, which is the principal peculiarity shown in fig. 20. In this fig. 20$^a$ the inclination is in a direction opposite to that shown in fig. 20. I prefer the position shown in fig. 20$^a$.

Similar letters of reference indicate like parts in all the figures where they occur.

Figure 1:
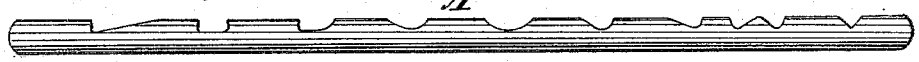
Figure 2:
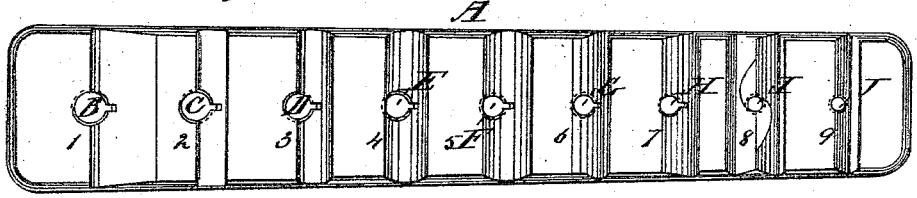

Referring to figs. 1 and 2, A is a solid bar of hardened steel; B C D, &c., are holes, drilled perpendicularly therein, and tapped in the ordinary manner, so as to form a clear and well-defined internal thread, adapted to be subsequently used for cutting screws. The holes may be all of the same size, or they may be of different sizes, adapted to cut different screws; or there may be but one hole in the entire piece of metal, leaving the remainder of the metal to serve merely as handles for holding it; or the metal may be smaller, and confined by any suitable tool or machine for holding it. I have, for convenience, represented a number of holes, of different sizes and threads, produced in the same piece of steel.

The surface, at the upper edge of each hole, is not a plane perpendicular to the hole. In some, the surfaces are simply oblique; in others, they are portions hollowed in various curves; and in others, they are chamfered and shouldered in various ways, as shown in figs. 1 and 2. The effect in every case is to present to the blank two or more of the cutting-threads in full sectional relief, which trace the thread on the blank by cutting out, and at the same time removing, the portion of metal so cut out, in the manner of the cutting-tool of an ordinary planer, cutting cleanly into the material of the iron, brass, or other metal on which the screw is to be produced.

It will of course be understood that the manipulation for cutting the screw by my improved die is, in general terms, the same as in cutting with other dies. A plain cylindrical bolt or wire is tapered slightly at one end, and introduced at the upper end of the hole, and is turned around therein; or the cylindrical rod being held stationary, the die A is turned around upon it.

As solid dies have been heretofore constructed, the face or edge surrounding the hole has been plane, and at right angles to the axis of the hole; consequently the entering end of the hole forms but one long tooth all around the hole, which has to force itself into the blank without cutting out the metal. And if there are formed teeth in full sectional relief, by making one or more notches or openings, the long tooth or thread opposite these full sectional teeth has to force itself also into the blank before it comes to those teeth; consequently they cannot cut out the thread; they only remove the metal in fine powder, and leave the greater part forced up. In my improved dies this long tooth is taken away, by forming the surface in the aforesaid manner; consequently the blank is presented in full to the cutting-tooth or edge, which can by these means cut out the metal cleanly, as a chisel in a planer or lathe, as plainly shown in red.

I have tested my invention on various metals. My dies commence with clean cuts, so that, after cutting, the screw is of the same diameter and length as the wire or bolt was before, while the ordinary dies make less perfect threads, and produce them partly by cutting, and partly by crushing and destroying or squeezing p the metal, so that, after cutting, the screw is always larger in diameter and longer than the wire or bolt was before the cutting.

Figure 3:
Figure 4:
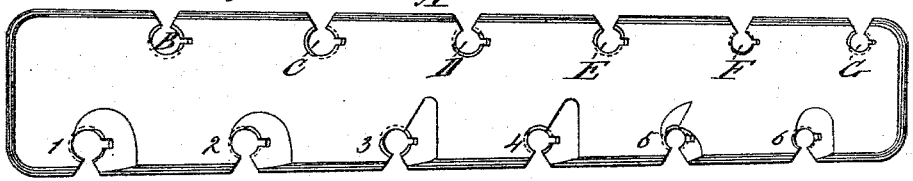
Figure 5:
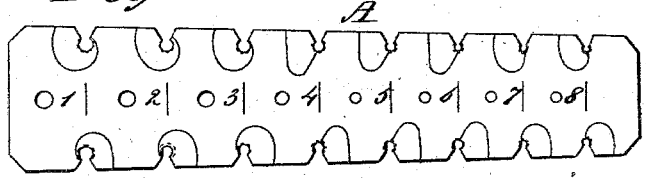
Figure 5 is a face view of another form.

Referring to figs. 3, 4, and 5, we find two series of holes, each near the edge of the plate, and each opening quite to the edge, by a small aperture, specially provided. In this construction the opening provides a series of corners or teeth, opposite which the threads are taken away, so as to allow these corners to cut in the before-described manner.

It is common in dies to groove or spline along one side of the hole, and in some instances this has been done at two or more points. Such splining increases the number of corners which are presented in cutting the thread; but I have demonstrated by experiment that the additional corners presented in my improved dies are far more effective. Increasing the number of corners by the old method, increased the efficiency of the die, but the metal is removed in the form of fine dust, and the thread is produced largely by compressing and destroying the metal. The outer edge of the threads so produced is soft and weak. The outer edge of my threads is as firm as any portion of the metal. I ascribe this difference mainly to a slight bending or springing of the bar or wire. There is a strain on the wire in entering my die, tending to bend it over to one side. I believe that my metal yields, to a limited extent, to this strain, and that the difference in the manner in which the metal is presented is sufficient, for this reason, to account for the change in the effect.

My dies cut, in practice, clean shavings of iron or brass, having coherent qualities, and curling up as they are removed, while the ordinary dies, corresponding thereto, remove the material in the form of fine powder.

Figure 6:
Figure 6 is a magnified cross-section of a part of a screw, cut according to the ordinary plan, showing the metal partly forced up, to form the thread.
Figure 7:
Figure 7 is a corresponding cross-section of a part of a screw, cut according to my improved plan, that is to say, with the use of my invention, showing the metal cut more clearly away, and thread consequently being more sound.
Figure 8:
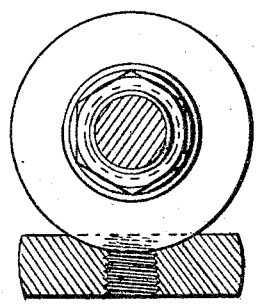
Figure 10:
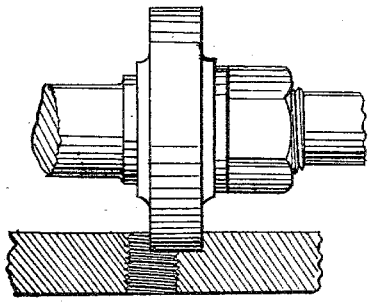
Figure 9:
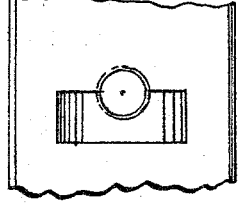
Figures 11, 12, 13:
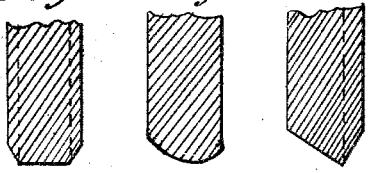
Figure 14:
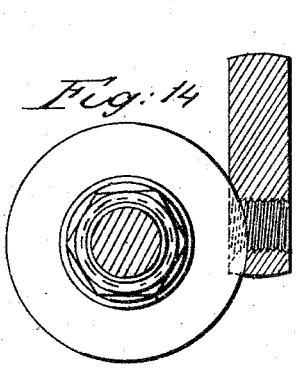
Figures 15, 16:
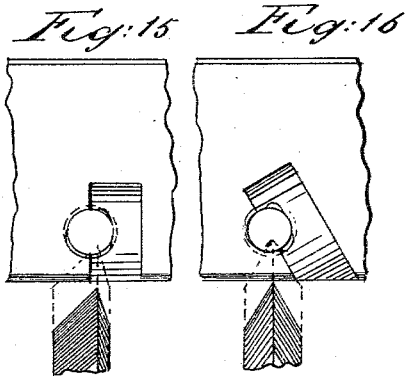

The ordinary dies crush up the metal so as to form threads which are complete in their appearance, but which are oftentimes not sound in their internal structure. Fig. 6 shows, in an enlarged section, the bad internal condition of the metal of the screw cut by ordinary dies. Fig. 7 shows the perfect condition of the screws cut by my dies.

Figure 17:
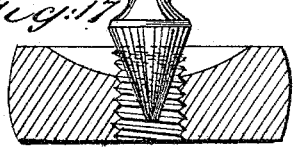

Fig. 17 shows a tapering "mill," used to remove a portion of the first threads or teeth before the die is hardened. It leaves the first tooth greatly shortened, and the next one slightly shortened, so that the first tooth cuts only one-third of the thread, the second another third, and the third completes it.

Referring to figs. 18, 19, and 20, only four holes, B, C, D, and E, are represented. The holes B and E are formed in the solid metal of the plate, which is milled out by the means indicated in figs. 8 to 13, and in fig. 17, so as to produce the peculiarities of my invention. The holes C and D, however, have additional novel features.

On introducing the bolt to my improved dies, it is liable to spring over to one side, as above described, to too great a distance. To avoid this, I apply, on the entering-face of my improved screw-plate, when intended for large screws, say quarter-inch and larger, guides formed and arranged as represented by M. These guides are secured to the main body of the screw-plate by screws $m$, as represented, so that they may be removed at pleasure, to allow the repairing or sharpening of the cutting portions of the dies. The holes in this guide M are but little larger than the bolt or blank screw which is to be cut. They receive it freely, and support it firmly against becoming deflected to too great an extent. This guide is important mainly in entering the screw, or first commencing to cut the screw-thread on the end of the bolt. After the work has been fairly commenced the guide is of far less importance.

Each of these holes, C and D, communicates by a slot with the edge of the die-plate, that connecting die D with the edge of the plate being, at the entering-face of the die, coincident with the centre of said die or hole, but thence running in an oblique direction across the edge of the plate, while that connecting-die C with the edge of the plate, instead of being coincident with the centre of the die or hole, is placed in advance of said centre, and is directed through the die-plate, perpendicularly to its surface, and not obliquely, as in the former case.

The hole C has another peculiarity. The steel which forms the cutting-angle, and which, consequently, performs nearly or quite all the labor of cutting the screw-thread, is in a separate piece, as indicated by N. This piece is of steel, hardened to the proper degree, and may be removed and exchanged as often as desired, in order to maintain a high degree of perfection in these cutting-edges. It may readily be ground on a grindstone, and this operation may be repeated until the opening C', which communicates between the hole C and the edge of the screw-plate, becomes inconveniently wide. This separate piece of steel, N, is secured to the main body of the screw-plate by screws $n$, as represented.

I do not claim in this patent any of the special constructions represented by figs. 6 to 16 inclusive; but What I do claim as new in dies for cutting screws, and desire to secure by Letters Patent, is as follows:

1. I claim a screw-cutting die, having a recessed surface, so as to present two or more cutting-threads in full sectional relief, as described and shown.

2. I claim the die C, having a recessed surface, so as to present two or more cutting-threads in full sectional relief, combined with the slot C', set in advance of the centre of the die, all as set forth.

3. I claim the guide M, in combination with a die having portions of one or more threads entirely removed from the entering-face thereof, the several parts being constructed and arranged substantially as and for the purpose herein set forth.

A. HOERMANN.

Witnesses:
C. C. LIVINGS,
WM. C. DEY.